Dec. 29, 1925.
A. E. OSWALD
ELECTRIC MOTOR
Filed Jan. 15, 1921
1,567,672
2 Sheets-Sheet 1
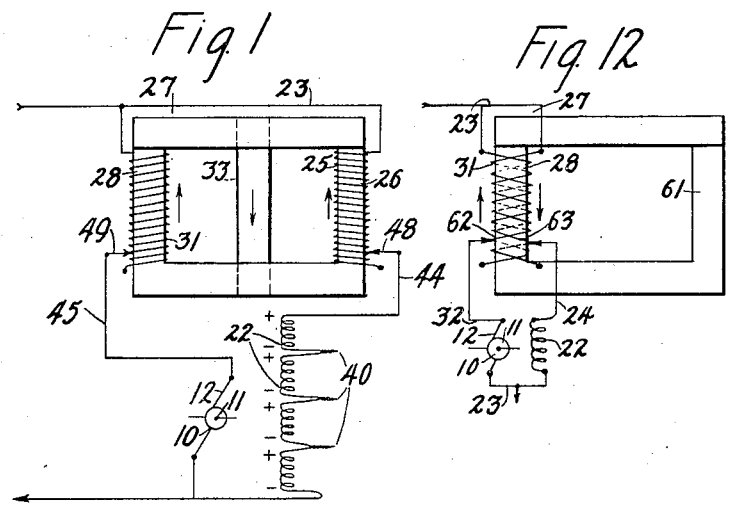
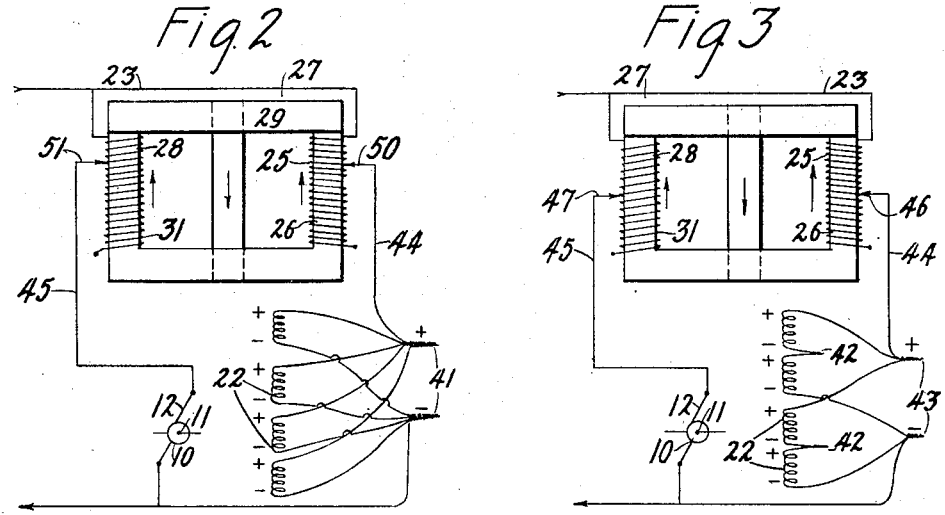
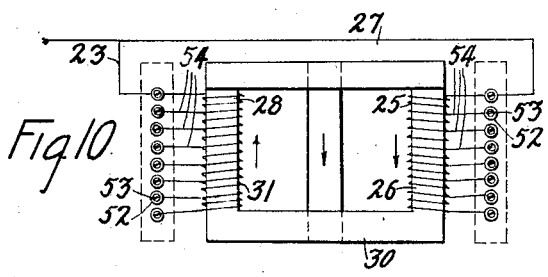

Dec. 29, 1925.
A. E. OSWALD
ELECTRIC MOTOR
Filed Jan. 15, 1921
1,567,672
2 Sheets-Sheet 2
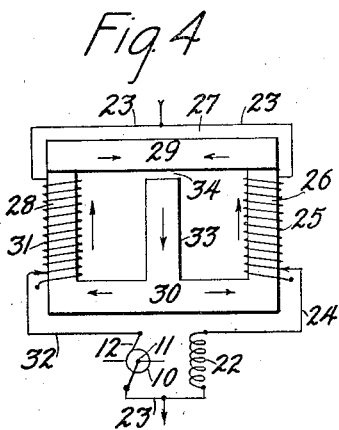
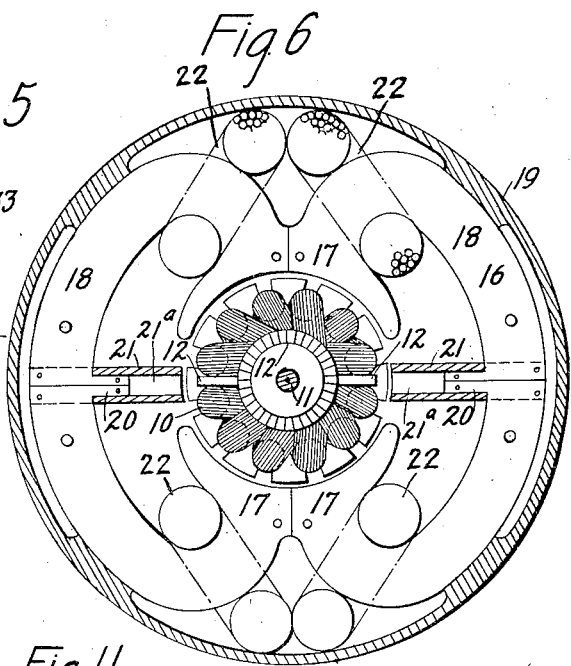
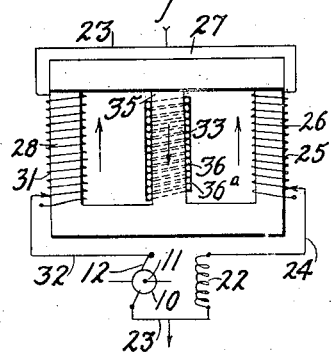
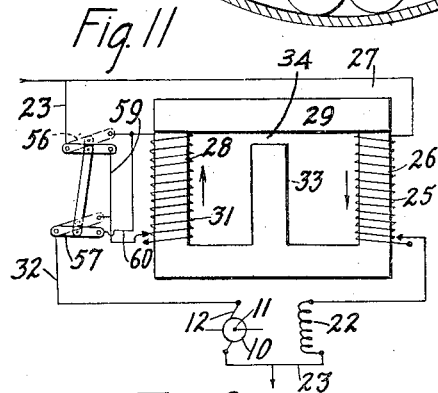
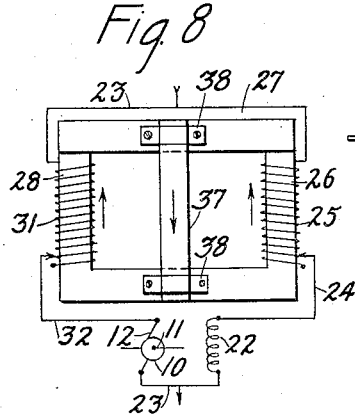
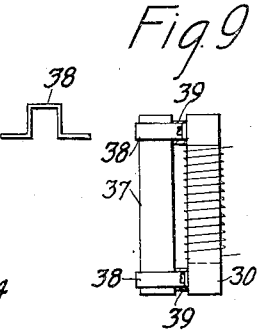
Inventor:
Alfred E Oswald
by B C Stickney
Attorney Patented Dec. 29, 1925.

1,567,672

UNITED STATES PATENT OFFICE.

ALFRED E. OSWALD, OF BOGOTA, NEW JERSEY, ASSIGNOR TO UNDERWOOD TYPEWRITER COMPANY, OF NEW YORK, N. Y., A CORPORATION OF DELAWARE.

ELECTRIC MOTOR.

Application filed January 15, 1921. Serial No. 437,397.

*To all whom it may concern:*

Be it known that I, ALFRED E. OSWALD, a citizen of the United States, residing in Bogota, in the county of Bergen and State of New Jersey, have invented certain new and useful Improvements in Electric Motors, of which the following is a specification.

This invention relates principally to alternating current motors, and one of its main objects is to provide simple and efficient means for running the motor at a predetermined constant speed for varying loads, and adapting the motor to different circuits having different frequencies and voltages.

Usually an alternating current commutator motor has the armature coil in series with the field coil, but the speed tends to increase if either the load is lessened or the voltage increased. In induction motors, circuits of different frequencies require different motors.

There is provided an efficient means for enabling the armature coil to co-operate with the field coil for speed-regulating purposes. The field is connected in shunt around the armature coil through the commutator. A speed-controlling coil is connected in series with the armature coil, and co-acts with a parallel speed-controlling coil, the latter placed in series with the field coils. These speed coils act one upon the other preferably through the medium of a transformer magnet or core which is separate from the motor magnets. The current is divided to flow through both of the speed-controlled coils, which are wound to oppose each other. Owing to the magnetic connection between the latter, each thereof acts and re-acts upon the other, in a manner that will be understood by those familiar with transformers. This mutual action is utilized in preventing the motor from over-speeding, by causing the armature to perform work in sending current back into the line.

Other features and advantages will hereinafter appear.

In the accompanying drawings,

Figure 1 is a diagram showing the preferred form of speed-regulating coils and the core therefor, and showing the field coils all connected up in series.

Figure 2 is a similar view, but showing the field coils all connected up in parallel.

Figure 3 is a similar view, showing the field coils connected in semi-parallel.

Figure 4 is a diagram, showing another form of core for the speed controller.

Figure 5 is a side view of the core.

Figure 6 is a sectional view through a motor in connection with the present improvements.

Figure 7 is a diagram similar to Figure 4, but showing a different form of magnetic impediment.

Figure 8 shows still another form of magnetic impediment.

Figure 9 is a side view of the core seen at Figure 8.

Figure 10 illustrates one method of cutting out the desired number of windings from the speed-controlling coils, to compensate for different groupings of the field coils in series, parallel or semi-parallel, and for other purposes.

Figure 11 illustrates one of the speed-controlling coils provided with a reversing switch.

Figure 12 shows the regulating coils both placed upon the same arm of the core, and one coil surrounding the other, or wound together therewith.

The armature 10 of the motor runs upon a shaft 11, and is provided with the usual commutator 12. The field coil 22 is composed of sections, which are placed near the pole pieces 17 of a laminated double horseshoe magnet 18; the magnet preferably having a cylindrical contour to fit in a barrel or casing 19. Each lamination is shown as made up of four similar sections, each section having a pole portion and also having at its other end a lug 20, the lugs being enclosed in a brass tubular device 21, which also contains at 21ª a solid or laminated iron extension or part, forming with the lug 20 an interpole. At Figure 4 a field coil 22 is illustrated as connected to the mains 23 in shunt around the armature. The field is connected by a wire 24 to a coil 25, which is wound around one member 26 of a rectangular frame or other continuous core, which is designated generally as 27, and comprises an opposite arm or member 28 and also upper and lower members 29 and 30. A second coil 31 is wound around the member 28, and connected in series by means of a wire 32 with the armature coil. The coils 25 and 31 are therefore connected to the mains in parallel circuits; and they are wound or connected to oppose each other, the direction of the magnetic flux being indicated by the arrows. The core may be formed with a central member 33, which forms a common magnetic return for the coils 25 and 31, and preferably consists of an iron arm extending partly across the core between the coils thereon. An air gap, as at 34, is left at the end of the return member 33, to serve as a magnetic impediment. The windings in the armature are about equal to those in any of the three coils. This is a modified form of transformer core, and the speed coils thereon are arranged to offer less inductance than would exist in an ordinary transformer. The core may be continuous or in the nature of a double horseshoe magnet; and since the coils thereon are wound so as to oppose each other, it results that the magnetic circuits are not completed through such core. Said core is provided with a return path for the magnetism, this return path being common to the speed coils. Since the magnetic circuit for each of the speed coils includes one side of the transformer frame, and also includes the same metallic return that is included in the other magnetic circuit, it results that in such return path the direction of the magnetism is the same for the opposing coils.

The armature at rest has its maximum inductance. Upon starting the motor, the coil 31 in series with the armature 10 acts somewhat like the secondary of a transformer. Both said coil 31 and the line are in series with the armature.

In an alternating circuit there is a momentary zero potential at each reversal of the current. During such reversal, however, the armature of the motor continues to revolve by momentum. At such moment the revolving armature causes a direct current (C. E. M. F.) to be momentarily generated, since at such time there is still some residual magnetism in the laminated iron field of the motor. This current, generated in the armature coils, is forced through the speed-controlling coil 31 into the line. There is therefore a momentary resemblance to the C. E. M. F. action of a direct current motor. It will be borne in mind that the idling armature, in momentarily sending current back into the line, performs a certain amount of work, and this tends to check or dampen the rotation of the armature at the moment.

During such moment, the speed-controlling coil in series with the armature has the effect of a transformer upon the speed-controlling coil 25, which is in series with the field, and generates a current in said speed-controlling coil 25, which flows through the field 22 and augments the power of the field magnet, whereby the strength of the C. E. M. F. current generated by the idly revolving armature 10 is increased.

During the remainder of each alternating cycle, the speed-controlling coils 31 and 25 do not affect each other, to control speed, since they are wound to oppose each other. It is during the C. E. M. F. operation that these speed-controlling coils co-operate, with the effect of increasing the voltage of the C. E. M. F., thereby tending to check the speed of the armature.

This oft-recurring condition tends to preserve uniformity of rotation of the armature under varying conditions of load. The view may be taken that the total theoretical load that is carried by the motor is made up partly of the work that it does in repeatedly sending a momentary current back into the line, and partly of the work which forms the output of the motor. If the output portion of the total theoretical load is doubled, the motor tends to slow down, and hence there is a reduction in the amount of the work which the motor is called upon to perform in generating C. E. M. F., and sending current back into the line. The decrease of speed and the decrease of current-generating work done by the armature continue, and more and more of the power from the line is diverted to carrying the doubled output portion of load put upon the motor. The speed will not descend much below the rate at which the motor was originally running under small load. Thus, the motor continues to operate at nearly or substantially constant speed, with varying loads, using an alternating current.

At Figure 7 the central return member 35 in the core 27 is made complete, but a magnetic impediment is produced by windings of copper wire 36 around said return member, these windings being soldered together at 36ª, so that induced electric current is set up in the metallic jacket or tubing 36, which produces the desired magnetic impediment.

At Figure 8 the return member 37 has no metallic connection to the main core 27, but is held thereto by straps 38, wooden separator blocks 39 being interposed between the return member 37 and the main core 27. This permits adjustment, since these blocks may be removed and thicker or thinner ones substituted.

Figure 1 shows the four field coils connected up in series to adapt the motor for low frequencies; substantially all of the coils 25, 31 being included in the circuits.

Figure 2 is similar to Figure 1, but shows the field coils all connected up in parallel to adapt the motor for high frequencies. It will be understood that in construction of the motor the ends of the coils may be twisted one to the other to form connections, as at 40 at Figure 1, or at 41 at Figure 2.

At Figure 3 the field coils are shown connected up in semi-parallel or multiple series suitable for intermediate frequencies; the individual coils being connected together at 42 and the sub-sets at 43.

At Figure 3, in which the field has in effect only half the number of windings as at Figure 1, a corresponding portion of the windings 25 is cut out. In order to keep the two coils of equal size, a corresponding number of windings at the other coil 31 are cut out; this reduction of the windings 25, 31, being effected by connecting the leading wires 44, 45 to the coils midway of their length, where indicated at 46, 47. At Figure 1 the connections are shown at 48, 49, in position to include substantially all windings in the coils; while at Figure 2 these connections are shown at 50, 51, as cutting out about three-fourths of the windings of these coils, inasmuch as the effective windings of the four field coils are only about one-fourth as many at Figure 2 as at Figure 1, since all of the four field coils are in parallel.

At Figures 1 to 3 the motor is shown connected up for 100 to 120 volts. Figure 1 shows an arrangement suitable for 20 to 35 cycles, Figure 2 for 60 to 80 cycles, and Figure 3 for 40 to 55 cycles.

As a convenience for shifting the connections to include various portions of the speed coils, there may be provided for each speed or regulating coil an arrangement such as is seen at Figure 10, in which there are provided, for example, eight terminals, each comprising a washer 52 and a screw 53, for convenience in attaching the ends of wires 44, 45; the topmost terminal being used, however, for the line 23, and the lowermost being connected to the other end of the coil. Individual leads 54 may connect the terminals 52, 53, to corresponding portions of the coils; the end of each lead being soldered to one of the windings in the coil. To secure the result indicated at Figure 1, the wires 44, 45, may be connected to the second terminal from the bottom. To secure the result indicated at Figure 2, said wires 44, 45, may be connected to the third terminal from the top; to secure the results seen at Figure 3, said wires 44, 45, may be connected to the fourth terminal from the bottom; it being understood that this arrangement is duplicated for the coil 31.

At Figure 11 is shown an arrangement similar to either 1, 2 or 3 but with one of the coils made reversible by means of a double switch 56, 57. When the switch is in the dotted-line position, the device operates the same as at Figure 1, for example. When the switch is put into full-line position, the coil 31 operates the same way as the coil 25. Heretofore, in order to reverse direction of rotation of any commutator motor, it has been necessary to reverse either of the armature or field connections, but not both. By reversing one of the speed-controlling coils, for example coil 31, the motor may be run in the opposite direction without any change between the armature and field coil connections; the torque being somewhat reduced. It will be noted, therefore, that so great a control over the rotation of the motor may be gained through dependence on the difference in phasing of the currents in the circuits, as to even effect a reversal of rotation. By reversing one of the coils, the inductance of the different circuits, while increased, is also altered in such a way that the circuit which originally had a tendency to lead now lags, which also causes the armature and field attraction now to be opposite, or reversed, causing the armature to rotate in opposite direction.

At Figure 11 one member 56 of a double switch is connected to the line 23, and the other member 57 is connected to the wire 32, these members being connected by an insulated link to act in unison. When the switch is in the dotted-line position, the current may flow in from the line 23 through switch member 56 and down through the coil 31 and through switch member 57 to the wire 32; the effect being the same as at Figure 1. When the switch is reversed by shifting it to the full-line position, the current coming in through the line 23 passes through switch member 56 and a lead 59 to the lower end of coil 31 and thence up through the coil and through a lead 60 to the switch member 57 and wire 32, so that the coil 31 works the same way as coil 25, thus reversing the motor. Inasmuch as the torque is reduced while this motor is running backward, this switch may conveniently be employed for stopping the motor without risk of injury thereto, such as would be the case if either the field or armature coil were suddenly reversed while the motor was running.

At Figure 12 the regulating coils are both placed upon the same arm 28 of the rectangular or other continuous core, and they are wound or connected to oppose each other. One coil may be placed within the other, or they may be wound together. The entire core frame is common to the coils, and it need not be either continuous or provided with an air-gap at 61, nor with any other magnetic impediment. The coil in series with the armature is here numbered 62, and the coil in series with the field is numbered 63.

Other variations may be resorted to within the scope of the invention, and portions of the improvements may be used without others.

Having thus described my invention, I claim:

1. An alternating current motor comprising an armature coil, a field coil in shunt around the armature, and regulating coils; one regulating coil in series with the armature, and the other in series with the field; said regulating coils connected in parallel circuits to oppose each other and co-operative to control the speed of the motor, and a core upon which said regulating coils are placed, said core having a magnetic return common to the coils.

2. An alternating current motor comprising an armature coil, a field coil in shunt around the armature, and regulating coils; one regulating coil in series with the armature, and the other in series with the field; said regulating coils connected in parallel circuits to oppose each other and co-operative to control the speed of the motor, and a core upon which said regulating coils are placed, said core having a magnetic return common to the coils, and provided with magnetic impediment.

3. An alternating current motor comprising an armature coil, a field coil in shunt around the armature, and regulating coils; one regulating coil in series with the armature, and the other in series with the field; said regulating coils connected in parallel circuits to oppose each other and co-operative to control the speed of the motor, and a core upon which said regulating coils are placed, said core being continuous and having a magnetic return common to the regulating coils, said magnetic return in the form of a metal arm extending partly across the core between the coils.

4. An alternating current motor comprising an armature coil, a field coil in shunt around the armature, and regulating coils in parallel circuits; one regulating coil in series with the armature, and the other in series with the field; said regulating coils connected to oppose each other and co-operative to control the speed of the motor, said field coil comprising several sections, to permit different combinations thereof, and provision being made to cut out certain windings of each of the regulating coils.

5. An alternating current motor comprising an armature coil, a field coil in shunt around the armature, and regulating coils in parallel circuits; one regulating coil in series with the armature, and the other in series with the field; said regulating coils co-operative to control the speed of the motor, means being provided to shift the connection to reverse the current through one of said regulating coils.

6. An alternating current motor comprising an armature coil, a field coil in shunt around the armature, and regulating coils in parallel circuits; one regulating coil in series with the armature, and the other in series with the field; said regulating coils connected to oppose each other and co-operative to control the speed of the motor, a core upon which said regulating coils are placed, said core having a magnetic return common to the coils, and provided with magnetic impediment, and means, including a switch, connected to reverse the current through one of said regulating coils, for reversing the direction of rotation of the motor while the field and armature coils remain unchanged.

7. An alternating current motor comprising an armature coil, a field coil in shunt around the armature, and regulating coils; one regulating coil in series with the armature, and the other in series with the field; said regulating coils connected to oppose each other and co-operative to control the speed of the motor, and a core upon which said regulating coils are placed, said core having a magnetic path common to the coils, said field coil composed of sections, to permit connecting up of sections in either series or parallel, and means being provided for varying each of said speed-controlling coils.

ALFRED E. OSWALD.